F. W. GRIFFIN.

PIPE VISE HOLDER.

APPLICATION FILED NOV. 22, 1915.

Reissued Jan. 11, 1916.

14,044.

Inventor

F. W. Griffin.

Witnesses

A. H. Hallenberger.

By Victor J. Evans

Attorney

THE COLUMBIA PLANOGRAPH CO., WASHINGTON, D. C

UNITED STATES PATENT OFFICE.

FREDRICK W. GRIFFIN, OF RICH HILL, MISSOURI.

PIPE-VISE HOLDER.

14,044. Specification of Reissued Letters Patent. Reissued Jan. 11, 1916.

Original No. 1,113,781, dated October 13, 1914, Serial No. 807,975. Application for reissue filed November 22, 1915. Serial No. 62,913.

*To all whom it may concern:*

Be it known that I, FREDRICK W. GRIFFIN, a citizen of the United States, residing at Rich Hill, in the county of Bates and State of Missouri, (formerly of Jacksonville, Florida,) have invented new and useful Improvements in Pipe-Vise Holders, of which the following is a specification.

This invention is an improved pipe vise holder adapted to be attached to an upright object such as a post, telegraph pole or tree and to be also attached on a bench or other like support and thus enabling a pipe and vise to be conveniently employed at any desired location, the invention consisting in the construction, combination and arrangement of devices hereinafter described and claimed.

Figure 1:
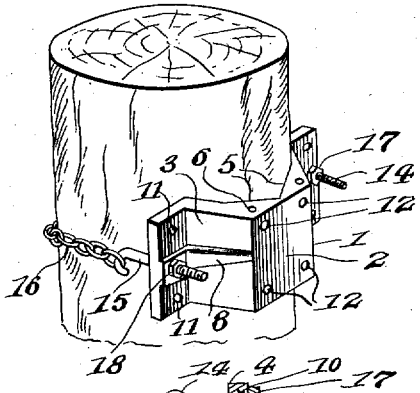
Figure 2:
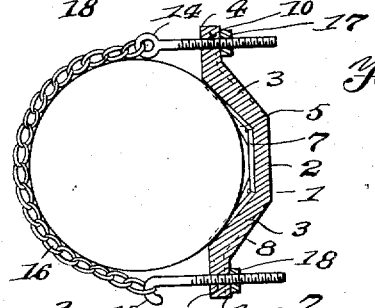
Figure 3:
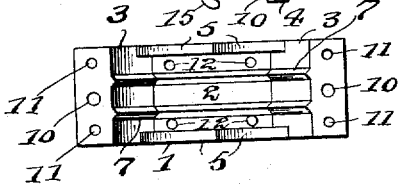

In the accompanying drawing:—Figure 1 is a perspective view of a pipe vise holder constructed in accordance with my invention. Fig. 2 is a sectional view of the same, in a horizontal position, and attached to a post, the latter being indicated in plan. Fig. 3 is a sectional view of the same on a plane at right angles to Fig. 2.

My improved pipe vise holder comprises a body or yoke 1 which is substantially arch-shaped and has a base wall 2 and a pair of end walls 3 formed at the ends of and diverging from the said base wall and provided at their outer ends with outwardly extending feet 4. At the sides of the yoke or body and in the angles between its base wall and its end walls are reinforcing lugs 5 which are provided with openings 6 for the reception of screws or bolts when the device is in use. On the inner side of the body or yoke are spaced longitudinally arranged ribs 7 which are triangular in cross section so as to present edges which are adapted to catch and become embedded in a post, pole or tree or other like object when the vise holder is attached thereto.

The end walls of the yoke or body are preferably but not necessarily provided on their outer sides with medially arranged reinforcing ribs 8, the lower ends of which are broadened and lie in the angles between the said walls and the feet or flanges 4. The feet or flanges 4 are provided with central openings 10 and also with openings 11, the latter for the reception of bolts or screws wherewith to secure the body or yoke on a flat supporting object, such as a table, plank, bench, building or the like. The wall 2 of the vise holder is provided with openings 12 for the reception of screws or bolts wherewith to secure a pipe vise on the said wall.

The holes 6 are also for the reception of bolts or screws to enable a pipe vise to be secured on either side of the body or yoke 1. To enable the pipe vise holder to be secured on a post, pole, tree or other like upright object, I provide an eye bolt 14 arranged in one of the openings 10, a hook bolt 15 arranged in the other opening 10 and a chain 16 connected to the eye of the eye bolt and the end of which is connected to the hook of the hook bolt, the chain being arranged to pass around the post or tree on the side opposite the body yoke and the eye bolt and hook bolt being then adjusted by the nuts 17—18 thereon so as to draw the chain tightly and thus clamp the yoke or body securely to the supporting object.

In practice, the yoke or body may be made out of pressed steel and stamped in one piece and may be made of any different size. The chain may be of any length and this is also true of the eye and hook bolts. My improved pipe vise holder enables a pipe vise to be secured for use at any desired point and to any convenient object or support.

I claim:—

1. A holder of the class described comprising a yoke or body having a base wall, end walls diverging from the base wall and provided at their outer ends with outwardly extending feet, the base wall and end walls being provided on their inner sides with spaced ribs, the body or yoke being also provided with lugs in the angles between the base wall and end walls and also with reinforcing ribs on the outer sides of the end walls.

2. A holder of the class described comprising a yoke or body having a base wall, end walls diverging from the base wall and provided at their outer ends with outwardly extending feet, the base wall and end walls being provided on their inner sides with spaced ribs, and the body or yoke being also provided with lugs in the angles between the base wall and end walls.

In testimony whereof I hereunto affix my signature in the presence of two witnesses.

FREDRICK W. GRIFFIN.

Witnesses:

E. EDMONSTON, Jr.,

BENNETT S. JONES.

Copies of this patent may be obtained for five cents each, by addressing the "Commissioner of Patents, Washington, D. C."